(12) United States Patent
Blunn et al.

(10) Patent No.: US 9,493,880 B2
(45) Date of Patent: Nov. 15, 2016

(54) PROCESS AND APPARATUS FOR PRECIPITATING CATIONIC METAL HYDROXIDES AND THE RECOVERY OF SULFURIC ACID FROM ACIDIC SOLUTIONS

(75) Inventors: Adam Justin Blunn, Evans Head (AU); Adam Daniel Longstaff, Wollongbar (AU)

(73) Assignee: AUSTRALIAN BIOREFINING PTY LTD, Evans Head, New South Wales (AU)

( * ) Notice: Subject to any disclaimer, the term of this patent is extended or adjusted under 35 U.S.C. 154(b) by 1182 days.

(21) Appl. No.: 13/145,448

(22) PCT Filed: Jan. 20, 2010

(86) PCT No.: PCT/AU2010/000044
§ 371 (c)(1),
(2), (4) Date: Mar. 5, 2012

(87) PCT Pub. No.: WO2010/083555
PCT Pub. Date: Jul. 29, 2010

(65) Prior Publication Data
US 2012/0156126 A1 Jun. 21, 2012

(30) Foreign Application Priority Data

Jan. 20, 2009 (AU) .................................. 2009900195

(51) Int. Cl.
*C25B 1/00* (2006.01)
*C25B 1/04* (2006.01)
(Continued)

(52) U.S. Cl.
CPC . *C25B 1/04* (2013.01); *C25B 1/00* (2013.01); *C25B 1/20* (2013.01); *C25B 1/22* (2013.01); *Y02E 60/366* (2013.01)

(58) Field of Classification Search
USPC ......................... 205/770, 771; 204/539, 252
See application file for complete search history.

(56) References Cited

U.S. PATENT DOCUMENTS 2,793,183 A * 5/1957 Thurman ............... B01D 61/44
204/237
2,810,686 A * 10/1957 Collins ................. C01B 17/901
204/263
(Continued)

OTHER PUBLICATIONS

International Preliminary Report on Patentability (IPRP) for PCT/AU2010/000044, issued Jul. 26, 2011.
(Continued)

*Primary Examiner* — Arun S Phasge
(74) *Attorney, Agent, or Firm* — Nixon & Vanderhye P.C.

(57) ABSTRACT

An electric current is passed through an acidic solution containing one or more soluble metal salts in an electrolytic cell divided by an anion exchange membrane. The acidic solution is fed into the cathode compartment whereby the passage of electric current at sufficient voltage causes the generation of hydrogen at the cathode. This gives rise to a localized very highly polarized region at the cathode resulting in a localized effective high relative pH. This causes the metal cation species to precipitate as a hydroxide (or oxide) species and electroadsorption/electrocoagulation causes the finely precipitated hydroxide (or oxide) species to adhere to the cathode. Electrodialytic transport of the liberated acid anions across the anion exchange membrane selectively removes the acid anions. Oxygen and hydrogen ions are formed by hydrolysis as the counter-reaction at the anode. Hydrogen ions combine with the anions to regenerate sulfuric acid. This enables the recovery of cationic metal species within a solution in which the bulk pH would not ordinarily allow hydroxide formation, while simultaneously regenerating sulfuric acid. The anion exchange membrane keeps the acid anion separate from the metal and acid solution so as to enable the concentration and recovery of sulfuric acid.

16 Claims, 1 Drawing Sheet

(51) Int. Cl.
*C25B 1/20* (2006.01)
*C25B 1/22* (2006.01)

(56) References Cited

U.S. PATENT DOCUMENTS 2,824,052 A * 2/1958 Czech ................. C25C 5/02
                                                    205/74
5,230,779 A    7/1993  Martin
5,258,106 A   11/1993  Habermann et al.
5,264,097 A *  11/1993  Vaughan ................. 205/770
5,423,959 A    6/1995  Sundblad et al.
5,567,293 A   10/1996  Paleologou et al.

OTHER PUBLICATIONS

International Search Report for PCT/AU2010/000044, dated Mar. 18, 2010.
Written Opinion for PCT/AU2010/000044, dated Mar. 18, 2010.

* cited by examiner

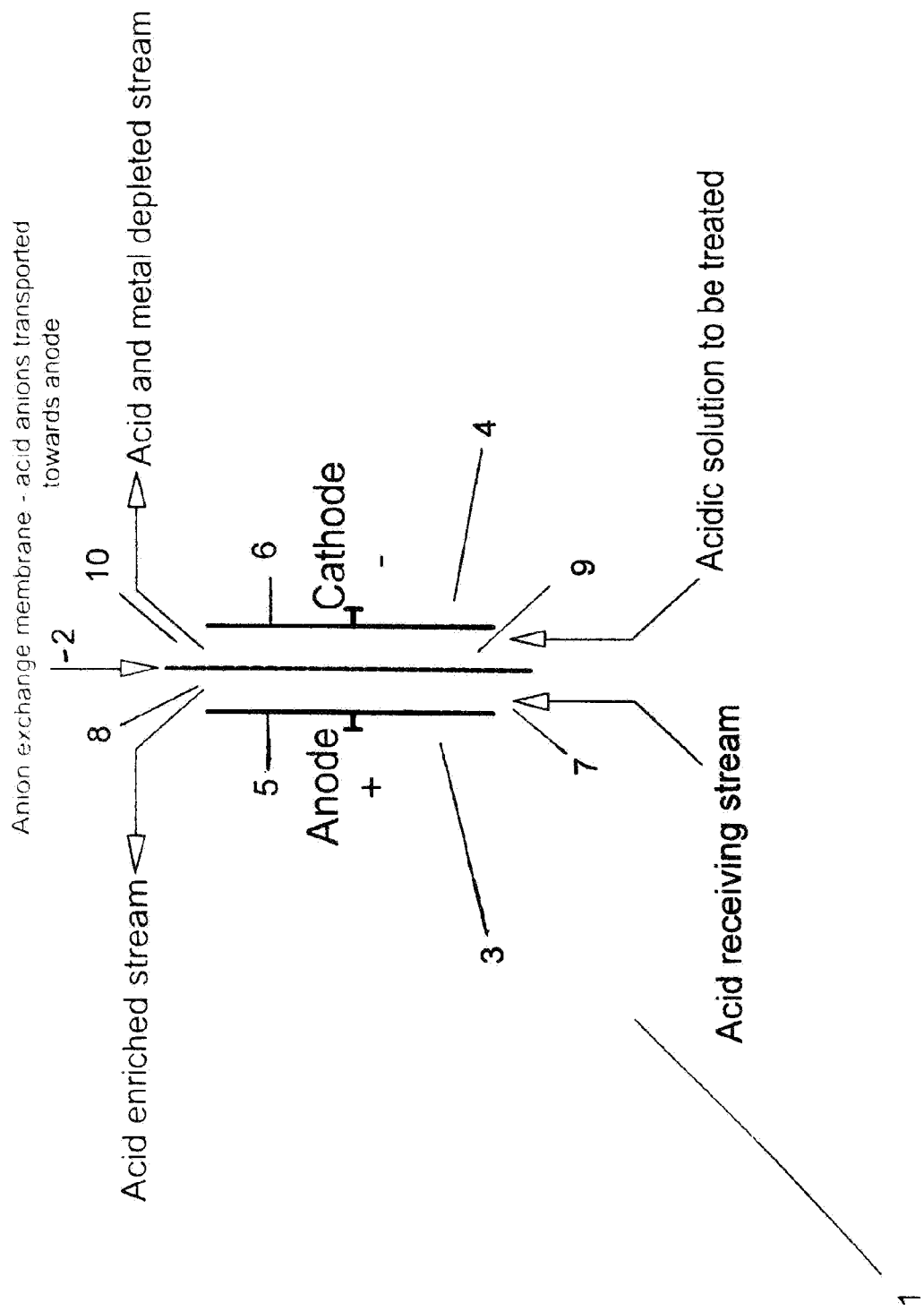

PROCESS AND APPARATUS FOR PRECIPITATING CATIONIC METAL HYDROXIDES AND THE RECOVERY OF SULFURIC ACID FROM ACIDIC SOLUTIONS

This application is the U.S. national phase of International Application No. PCT/AU2010/000044 filed 20 Jan. 2010 which designated the U.S. and claims priority to AU Patent Application No. 2009900195 filed 20 Jan. 2009, the entire contents of each of which are hereby incorporated by reference.

FIELD OF THE INVENTION

This invention relates to an electrochemical process for precipitating cationic metal hydroxides and the recovering of sulfuric acid from highly acidic solutions as are commonly found in mineral processing and a number of other industrial processes such as metal finishing, as well as in leachates produced by acid rock drainage as a result of environmental oxidation of sulfide bearing rocks or acid sulfate soils.

BACKGROUND OF THE INVENTION

This invention has particular application in solutions that are of low pH and is particularly relevant in mining and industrial process streams. Typically, solutions produced by mining and industrial processes produce solutions with a heavy concentration of a range of metal cations and which are highly acidic. Under these conditions, most metal cations are soluble and do not precipitate in solutions of low pH. In order to recover the metals and sulfate, these solutions would conventionally be treated by neutralization using a pH adjusting reagent. However, due to the high acid concentration of these solutions, depending on the specific metal cation, the acid concentration would generally need to be reduced by between 100 fold and 100,000 fold in order for the metal cation to precipitate. This may either then require thickening, dewatering or filtering processes or levels of neutralizing agent such that recovery is not practical or commercially viable.

SUMMARY OF THE INVENTION

The present invention involves integrating the following processes: (i) electropolarization to cause metal cations to precipitate as a hydroxide (or oxide) species, (ii) electroadsorption/electrocoagulation to cause the finely precipitated hydroxide (or oxide) species to adhere to the cathode, and (iii) electrodialytic transport of the acid anion across the anion exchange membrane to selectively remove the acid anions so as to enable the concentration and recovery of sulfuric acid.

According to the present invention, an electric current is passed through an acidic feed solution containing one or more soluble metal salts (generally referred to in the specification and drawing as either the "acidic feed solution" or "acidic solution to be treated") using an electrolysis cell having a cathode and an anode separated by an anion exchange membrane. The anion exchange membrane selected should be stable against sulfuric acid.

The acidic solution containing one or more soluble metal salts is fed into the cathode compartment whereby the passage of electric current at sufficient voltage causes hydrogen to be generated at the cathode. This gives rise to a localized very highly polarized region at the cathode resulting in localized effective high relative pH. This causes the metal cation species to precipitate at the cathode as hydroxide (or oxide) species and electroadsorption/electrocoagulation causes the finely precipitated hydroxide (or oxide) species to adhere to the cathode. This occurs within a solution in which the bulk pH would not ordinarily allow hydroxide formation.

As a result of precipitation of the cation species at the cathode, the anions (that were previously associated with the precipitated cation species) are liberated and migrate through the anion exchange membrane into the anode compartment. Electrodialytic transport of the liberated acid anions across the anion exchange membrane selectively removes the acid anions. Oxygen and hydrogen ions are formed by hydrolysis as the counter-reaction at the anode. As a result of the oxygen generation at the anode, hydrogen ions are transferred to the bulk of solution which combine with the anions to regenerate sulfuric acid. The anion exchange membrane keeps the acid anions separate from the original metal and acid bearing solution so as to enable the concentration and recovery of sulfuric acid.

Furthermore, an apparatus for the above process is described in an electrolysis cell having at least one anode and one cathode divided by an anion exchange membrane into an anode compartment and a cathode compartment. The anode compartment has an opening for the entry of the acid receiving stream and an opening for exit of the acid enriched stream. The cathode compartment has an opening for the entry of the acidic solution to be treated containing the soluble metal salt and an opening for exit of the acid and metal depleted stream. This process can be applied using a variety of electrochemical cell configurations (including both standard and flow cell configurations).

Accordingly, the present invention enables the recovery of cationic metal species, predominantly by way of precipitation, as insoluble hydroxides or oxides (which precipitate due to the localized very high polarization at the cathode resulting in localized effective high relative pH and adhere to the cathode due to electroadsorption/electrocoagulation) within a solution in which the bulk pH would not ordinarily allow hydroxide formation, while simultaneously regenerating and recovering sulfuric acid.

The unexpected outcome and importance of this invention, which is both surprising and counterintuitive, is that it enables the precipitation of cationic metal species as insoluble hydroxides (or oxides) in solutions at low pH where most metal cations are soluble and do not precipitate unless the acid concentration is reduced by between 100 fold and 100,000 fold depending upon the specific metal cation involved.

The invention can be used for the recovery of a range of metals which include, but are by no means limited to, magnesium, iron, nickel, aluminum, manganese, cobalt and chromium, and also the other transition metals.

The advantages to be gained from this process include, recovery of soluble metals from solution as hydroxides (or oxides), physical separation of the precipitated cations which either does not require or reduces the need for thickening, dewatering or filtering processes, minimization of solid waste, recovery of acids that are otherwise present as soluble metal salts, and where the process is used for waste treatment—recovery of water from waste streams in mineral processing and other industrial processes.

BRIEF DESCRIPTION OF THE DRAWING

In order that this invention may be more readily understood and put into practical effect, reference will now be made to the accompanying drawing which illustrates the preferred embodiment of the invention wherein:

FIG. 1 is a diagram of an electrolytic flow cell showing the operation of the process for recovery of metal hydroxides and sulfuric acid.

DETAILED DESCRIPTION OF THE PREFERRED EMBODIMENT

Referring to FIG. 1, the electrochemical apparatus is in the form of an electrochemical flow cell 1 divided by an anion exchange membrane 2 into an anode compartment 3 and a cathode compartment 4.

The anode 5 in the anode compartment 3 consists of a dimensionally stable valve metal electrode, for example a titanium electrode, which is connected to the positive pole of a direct current source. The design of such dimensionally stable metal electrodes, especially titanium electrodes, is well known in electrolysis and described in *Industrial Electrochemistry—Second Edition* by D. Pletcher and F. C. Walsh, Springer 1990, ISBN-13: 978-0412304101. An example is also disclosed in Canadian Patent No. CA915629 (A). Other electrodes including carbon-based electrodes such as carbon and/or glassy carbon electrodes could potentially be used.

The cathode 6 in the cathode compartment 4 is in the form of an expanded metal or sheet metal or metal gauze electrode consists of, for example, but is by no means limited to, titanium, copper, steel, or stainless steel which is connected through a removable electrical terminal to the negative pole of the direct current voltage source.

The anode compartment has an opening 7 for the entry of the acid receiving stream and an opening 8 for exit of the acid enriched stream.

The cathode compartment has an opening 9 for the entry of the acidic solution to be treated containing the soluble metal salt and an opening 10 for exit of the acid and metal depleted stream. The acidic solution to be treated containing the soluble metal salt is fed into the cathode compartment. The passage of electric current when sufficient voltage is applied by the voltage source causes hydrogen to be generated at the cathode and creates a local very highly polarized region at the cathode surface resulting in effective high relative pH. This causes the metal cation species to precipitate as a hydroxide (or oxide) species. The metal hydroxides (or oxides) can then be removed from the cathode by various means such as gentle scraping or brushing.

As a result of precipitation of the cation species at the cathode, the anions (that were previously associated with the precipitated cation species) are liberated and during electrolysis migrate through the anion exchange membrane into the anode compartment. Electrodialytic transport of the liberated acid anions across the anion exchange membrane selectively removes the acid anions. As the counter-reaction at the anode, oxygen and hydrogen ions are formed in the anode compartment as the dissociation of water takes place. The oxygen is released as gas and the hydrogen ions are transferred to the bulk of solution which combines with the sulfate ions to regenerate sulfuric acid. The concentration of the sulfuric acid is raised in the course of the electrolysis process and water is added as needed. The anion exchange membrane keeps the acid anions and sulfuric acid present in the receiving solution separate from the original metal and acid bearing solution so as to enable the concentration and recovery of sulfuric acid. The sulfuric acid enriched stream exits through outlet 8 and the sulfuric acid is recovered therefrom. The acid and metal depleted stream exits through outlet 10.

The following examples using an electrolysis cell of the type shown is the drawing are provided in order to illustrate the process in operation:

Example 1

1 liter of solution containing approximately 160 g/l total sulfate, 45 g/l iron, 4 g/l nickel, and 16 g/l magnesium at a pH less than 0.5 was fed into the cathode compartment and electrolyzed for 78 hours at 3 amps. 148 g of sulfuric acid was recovered and the treated solution contained a final concentration of less than 0.5 g/l iron, 0.1 g/l nickel, 8 g/l magnesium at a final pH of 4.1. The metal (present as hydroxides) was recovered as an adherent precipitate at the cathode which was then removed by gentle scraping or brushing.

Example 2

1 liter of solution containing 20 g/l iron, 11 g/l free sulfuric acid, 6.5 g/l nickel, 6 g/l aluminium and 18 g/l magnesium, all as sulfates, was fed into the cathode compartment of an electrolytic flow cell and electrolyzed for 106 hours at 2 amps. The treated solution contained less than 0.5 g/l iron, 0.1 g/l nickel, 0.1 g/l aluminium and approximately 12 g/l magnesium. More than 80% sulfate was recovered as clean sulfuric acid at a concentration of approximately 100 g/l. The metal (present as hydroxides) was recovered as an adherent precipitate at the cathode which was then removed by gentle scraping or brushing.

Example 3

1 liter of solution containing 45 g/l iron, 35 g/l free sulfuric acid, 3.9 g/l nickel, 6 g/l aluminium, 1.5 g/l manganese, 0.5 g/l calcium and 16 g/l magnesium, all as sulfates, was fed into the cathode compartment of an electrolytic flow cell and electrolyzed for 80 hours at 3 amps. The treated solution contained less than 0.2 g/l iron, 0.1 g/l nickel, 0.1 g/l aluminium, 0.1 g/l manganese and approximately 8 g/l magnesium. The calcium concentration was not quantified in this instance. The final pH of the solution was 4.3 and the over 90% of the contained sulphate was recovered as clean acid at a concentration of ~30 g/l. The metal (present as hydroxides) was recovered as an adherent precipitate at the cathode which was then removed by gentle scraping or brushing.

Example 4

0.5 liter of solution containing 13.6 g/l iron, pH 0.55, 5.2 g/l nickel, 0.7 g/l manganese, 0.12 g/l cobalt and 0.14 g/l chromium, all as sulfates, was fed into the cathode compartment of an electrolytic flow cell and electrolyzed for 21 hours at 3 amps. The treated solution contained 2.7 g/l iron, 2.1 g/l nickel, 0.43 g/l manganese, 0.02 g/l cobalt, 0.002 g/l chromium, and final pH of 2.48. More than 60% sulfate was recovered as clean sulfuric acid at a concentration of approximately 20 g/l. The metal (present as hydroxides) was recovered as an adherent precipitate at the cathode which was then removed by gentle scraping or brushing.

Example 5

0.5 liter of solution containing 12.8 g/l iron, pH 0.55, 4.9 g/l nickel, 0.67 g/l manganese, 0.10 g/l cobalt and 0.13 g/l chromium, all as sulfates, was fed into the cathode compartment of an electrolytic flow cell and electrolyzed for 40 hours at 3.6 volts. The treated solution contained 0.7 g/l iron, 1.0 g/l nickel, 0.34 g/1 manganese, 0.002 g/l cobalt, 0.0004 g/l chromium, and final pH of 2.99. More than 85% sulfate was recovered as clean sulfuric acid at a concentration of approximately 24 g/l. The metal (present as hydroxides) was recovered as an adherent precipitate at the cathode which was then removed by gentle scraping or brushing.

The invention enables the recovery of metal hydroxide (or oxide) species and simultaneous regeneration of the free acid.

This invention has particular application in mineral processing and a number of other industrial processes, particularly processes such as metal finishing, etching or extracting solutions. The sulfuric acid of increased concentration may be recycled and fed back into the relevant mineral or industrial process as a fresh component. Alternatively, the regenerated sulfuric acid can be removed and used for other applications.

The invention has application in the treatment of acid waste for the recovery of valuable components, and for environmental remediation where the waste solution represents an environmental hazard either by virtue of its acidic nature or solubilsation of toxic metal species.

The process may also be applied in the treatment of leachates produced by acid rock drainage as a result of environmental oxidation of sulfide bearing rocks or acid sulfate soils.

Accordingly, the invention has both commercial and environmental advantages.

It will of course be realized that while the foregoing has been given by way of illustrative examples of this invention, all such and other modifications and variations thereto as would be apparent to persons skilled in the art are deemed to fall within the broad scope and ambit of this invention as is herein set forth.

The invention claimed is:

1. An electrochemical process for the precipitation of cationic metal hydroxide or oxide species and the recovering of sulfuric acid from highly acidic solutions, said process comprising:
   (i) passing an electric current through an electrolysis cell having at least one cathode and one anode, wherein the cell is divided by an anion exchange membrane into a cathode compartment and an anode compartment, wherein the cathode compartment contains an acidic feed solution containing one or more soluble metal salts, wherein the anode compartment contains an aqueous sulfuric acid solution, and thereby:
      (a) generating hydrogen at the cathode;
      (b) using electropolarization to cause metal cations to finely precipitate as a hydroxide or oxide species at the cathode;
      (c) using electroadsorption/electrocoagulation to cause the finely precipitated hydroxide or oxide species to adhere to the cathode;
      (d) forming oxygen and hydrogen ions by hydrolysis as a counter reaction at the anode;
      (e) electrodialytically transporting acid anions from the cathode compartment across the anion exchange membrane into the anode compartment, which transport results in liberated acid anions in the anode compartment;
      (f) combining the hydrogen ions with the liberated acid anions to regenerate sulfuric acid, wherein said anion exchange membrane keeps the liberated acid anions separate from the acidic feed solution so as to enable the concentration and recovery of sulfuric acid;
   (ii) recovering the metal hydroxides or oxides and the concentrated sulfuric acid.

2. A process according to claim 1, wherein the generation of hydrogen at the cathode gives rise to a localized very highly polarized region at the cathode.

3. A process according to claim 2, wherein the process occurring at the cathode results in effective high relative pH.

4. A process according to claim 1, wherein the cationic metal hydroxide or oxide species are precipitated from solutions of less than or equal to pH 4.

5. A process according to claim 1, wherein the electrolysis cell is a flow cell.

6. A process according to claim 1, wherein the electrolysis cell is a standard cell and the cathode compartment is replenished batch-wise.

7. A process according to claim 1, wherein at least one of the metal cations present in the acidic feed solution is a transition metal.

8. A process according to claim 7, wherein at least one of the metal cations present in the acidic feed solution is iron.

9. A process according to claim 7, wherein at least one of the metal cations present in the acidic feed solution is nickel.

10. A process according to claim 7, wherein at least one of the metal cations present in the acidic feed solution is manganese.

11. A process according to claim 7, wherein at least one of the metal cations present in the acidic feed solution is cobalt.

12. A process according to claim 7, wherein at least one of the metal cations present in the acidic feed solution is chromium.

13. A process according to claim 1, wherein at least one of the metal cations present in the acidic feed solution is magnesium.

14. A process according to claim 1, wherein at least one of the metal cations present in the acidic feed solution is aluminum.

15. A process according to claim 1, wherein the metal hydroxide or oxide is removed from the cathode by mechanical means.

16. A process according to claim 15 wherein the metal hydroxide or oxide is removed from the cathode by gentle scraping or brushing.

* * * * *